United States Patent
Jagadeesan et al.

(10) Patent No.: US 7,877,086 B2
(45) Date of Patent: *****Jan. 25, 2011

(54) PROCESSING LOCATION INFORMATION AMONG MULTIPLE NETWORKS

(75) Inventors: Ramanathan T. Jagadeesan, San Jose, CA (US); Andrew C. Chung, Fremont, CA (US); Steven R. Donovan, Plano, TX (US); Mark Grayson, Cary, NC (US); Bich T. Nguyen, Los Altos, CA (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/555,479

(22) Filed: Sep. 8, 2009

(65) Prior Publication Data

US 2009/0325582 A1 Dec. 31, 2009

Related U.S. Application Data

(63) Continuation of application No. 11/392,408, filed on Mar. 28, 2006, now Pat. No. 7,593,722.

(51) Int. Cl.
*H04M 3/00* (2006.01)
(52) U.S. Cl. ............... 455/418; 455/456.1; 455/432.1; 370/331; 370/338
(58) Field of Classification Search ............. 455/432.1, 455/456.1, 418; 370/331
See application file for complete search history.

(56) References Cited

U.S. PATENT DOCUMENTS

| | | | |
|---|---|---|---|
| 6,466,556 B1 | 10/2002 | Boudreaux | 370/331 |
| 6,490,451 B1 | 12/2002 | Denman et al. | 455/436 |
| 6,496,691 B1 | 12/2002 | Easley et al. | 455/415 |
| 6,690,659 B1 * | 2/2004 | Ahmed et al. | 370/328 |
| 6,721,565 B1 | 4/2004 | Ejzak et al. | 455/436 |
| 6,973,659 B2 | 12/2005 | Smith et al. | 455/436 |
| 6,980,535 B2 | 12/2005 | Bennett | 370/331 |
| 6,980,808 B1 | 12/2005 | Smith | 455/450 |
| 7,016,690 B2 | 3/2006 | Corson et al. | 455/456.1 |
| 7,593,722 B2 * | 9/2009 | Jagadeesan et al. | 455/418 |
| 7,633,904 B2 * | 12/2009 | Venkatachalam | 370/331 |
| 2003/0174688 A1 * | 9/2003 | Ahmed et al. | 370/349 |

(Continued)

OTHER PUBLICATIONS

Notification of Transmittal of the International Search Report and the Written Opinion of the International Searching Authority, or the Declaration, International Application No. PCT/US06/44437, 10 pages, Sep. 13, 2007.

*Primary Examiner*—Lester Kincaid
*Assistant Examiner*—Charles Shedrick
(74) *Attorney, Agent, or Firm*—Baker Botts L.L.P.

(57) ABSTRACT

Gathering location information from a first wireless network to determine whether to anchor a communication session in a second wireless network, a mobile node capable of communicating with both the first wireless network and the second wireless network, includes receiving location information from the first wireless network as the mobile node moves through one or more service areas of the first wireless network. It is determined whether a triggering event occurs. If the triggering event occurs, the location information is stored to determine whether to anchor a session in the second wireless network.

20 Claims, 3 Drawing Sheets

U.S. PATENT DOCUMENTS

| | | |
|---|---|---|
| 2004/0235477 A1 | 11/2004 | Picha et al. .................. 455/439 |
| 2004/0249915 A1 | 12/2004 | Russell ....................... 709/223 |
| 2007/0026866 A1* | 2/2007 | Krishnamurthi et al. .... 455/440 |
| 2007/0232322 A1* | 10/2007 | Jagadeesan et al. ...... 455/456.1 |
| 2009/0325582 A1* | 12/2009 | Jagadeesan et al. ......... 455/436 |

* cited by examiner

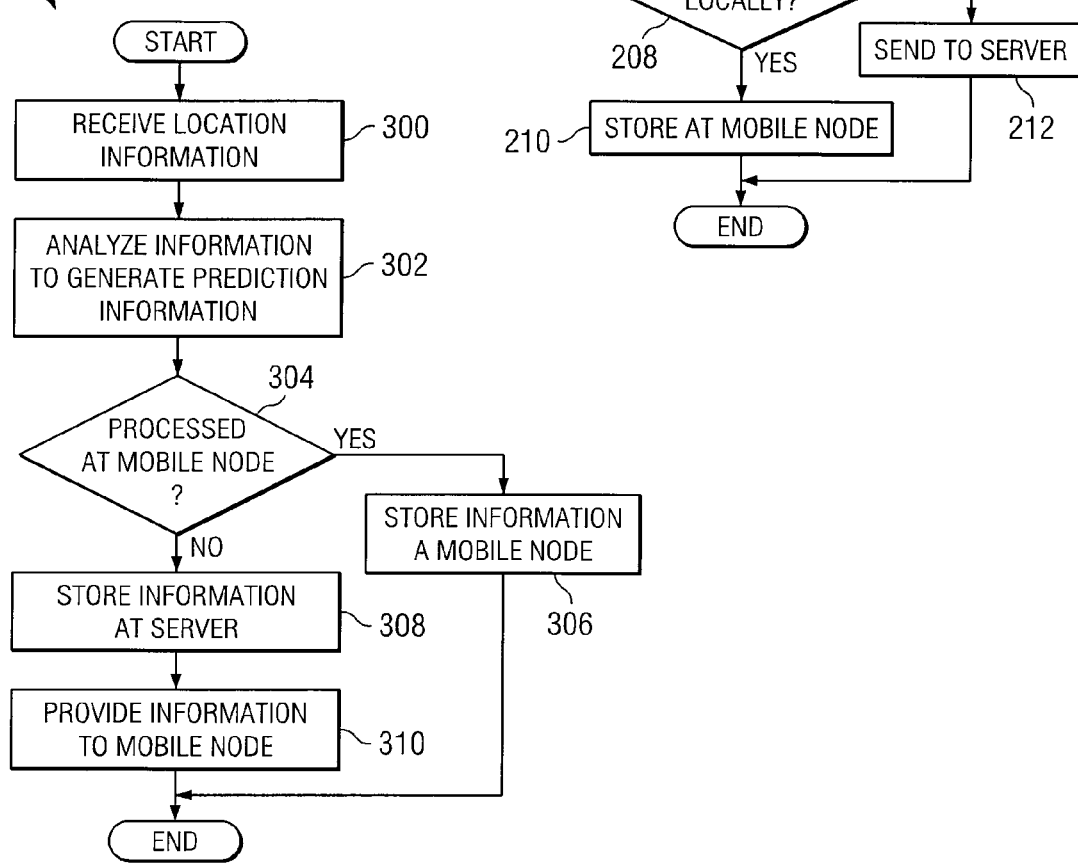

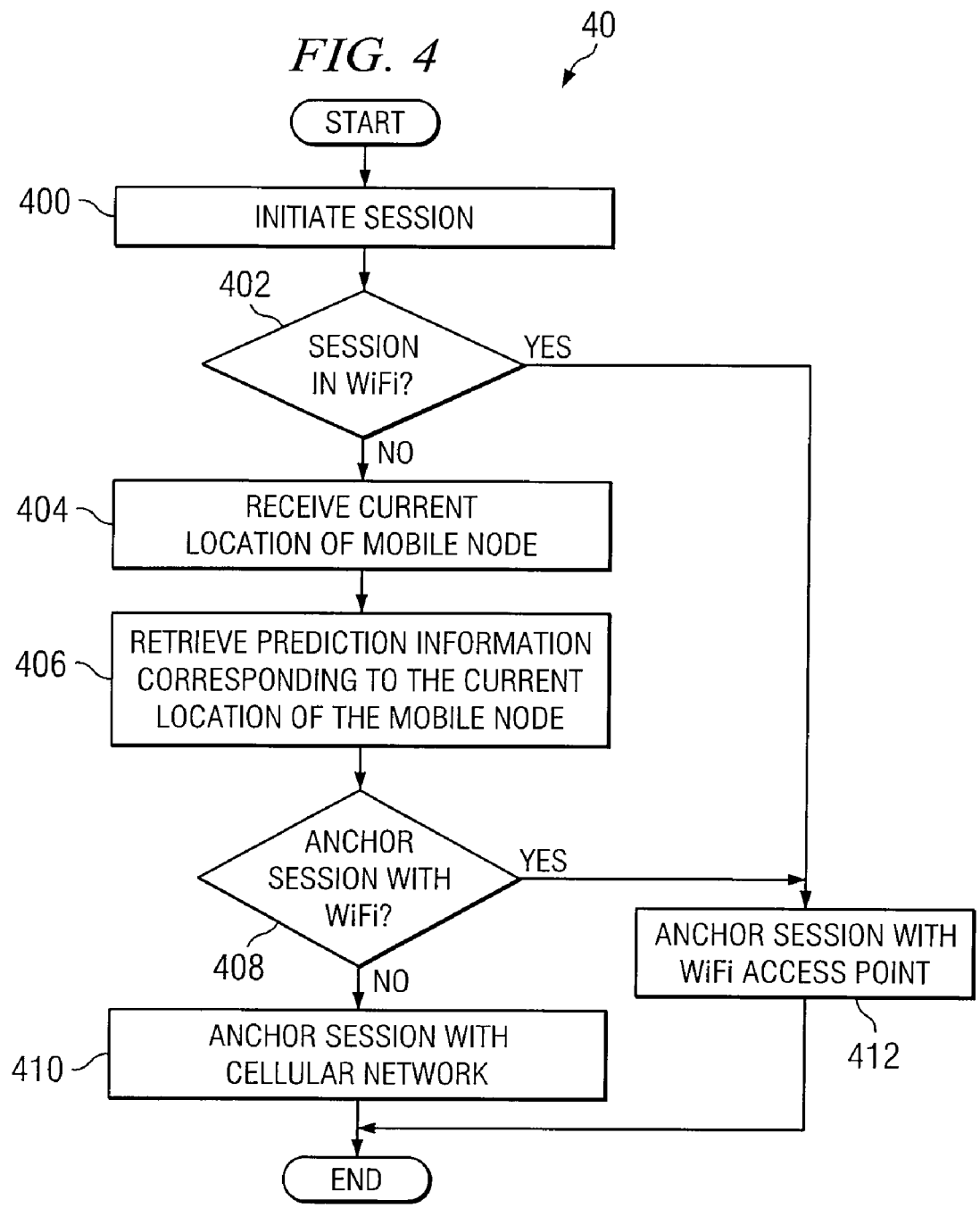

PROCESSING LOCATION INFORMATION AMONG MULTIPLE NETWORKS

CROSS-REFERENCE TO RELATED APPLICATION

This application is a continuation of U.S. application Ser. No. 11/392,408 filed Mar. 28, 2006 and entitled "Processing Location Information Among Multiple Networks".

TECHNICAL FIELD

This invention relates generally to the field of telecommunications and more specifically to processing location information among multiple networks.

BACKGROUND

A communication session for a mobile node is typically anchored at an anchor point of a communication network. The anchor point processes the communication session while the node is involved in a handoff process. In certain cases, a node may be operable to communicate with different types of networks. For example, a node may communicate with a Wireless Fidelity (WiFi) system of an Internet Protocol (IP) network and with a cell site of a cellular network. Known techniques for anchoring a communication session for such a node are not efficient in certain situations. For example, unnecessarily anchoring a communication in the IP network can result in long distance charges applying to a local communication.

SUMMARY OF THE DISCLOSURE

In accordance with the present invention, disadvantages and problems associated with previous techniques for anchoring communication sessions may be reduced or eliminated.

According to one embodiment of the present invention, gathering location information from a first wireless network to determine whether to anchor a communication session in a second wireless network, a mobile node capable of communicating with both the first wireless network and the second wireless network, includes receiving location information from the first wireless network as the mobile node moves through one or more service areas of the first wireless network. It is determined whether a triggering event occurs. If the triggering event occurs, the location information is stored to determine whether to anchor a session in the second wireless network.

According to another embodiment, analyzing location information from a first wireless network to determine whether to anchor a communication session in a second wireless network, a mobile node capable of communicating with both the first wireless network and the second wireless network includes receiving location information for a time interval as the mobile node moves through the first wireless network. A prediction is developed based on the location information. The prediction includes whether the mobile node will move into the second wireless network during the communication session initiated at a particular location in the first wireless network.

According to yet another embodiment, determining whether to anchor a communication session in a second wireless network, a mobile node capable of communicating with both a first wireless network and the second wireless network includes initiating a communication session in the first wireless network. A current location of the mobile node in the first wireless network is determined. Prediction information generated from location information previously gathered as mobile node moves through one or more services in the first wireless network is retrieved, and it is determined whether to anchor the communication session in a second network according to the prediction information.

Certain embodiments of the invention may provide one or more technical advantages. A technical advantage of one embodiment includes gathering location information of a mobile node to determine an anchor point to use for a communication session. Using the location information to determine an anchor point provides for efficiently using network resources during the communication session. Another technical advantage of one embodiment includes learning the location information to determine the anchor point to use for the communication session without manually configuring location information and without attempting to access proprietary geo-coded location databases of cellular service providers. Another technical advantage of one embodiment includes learning usage patterns of the mobile node, and using the usage patterns to select the anchor point for the communication session. Therefore, a communication session can be anchored more efficiently using network resources.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a flowchart for gathering the location information;

FIG. 3 is a flowchart for processing the location information to generate prediction information; and FIG. 4 is a flowchart for determining whether to anchor the communication session according to the gathered location information.

DETAILED DESCRIPTION OF THE DRAWINGS

Figure 1:
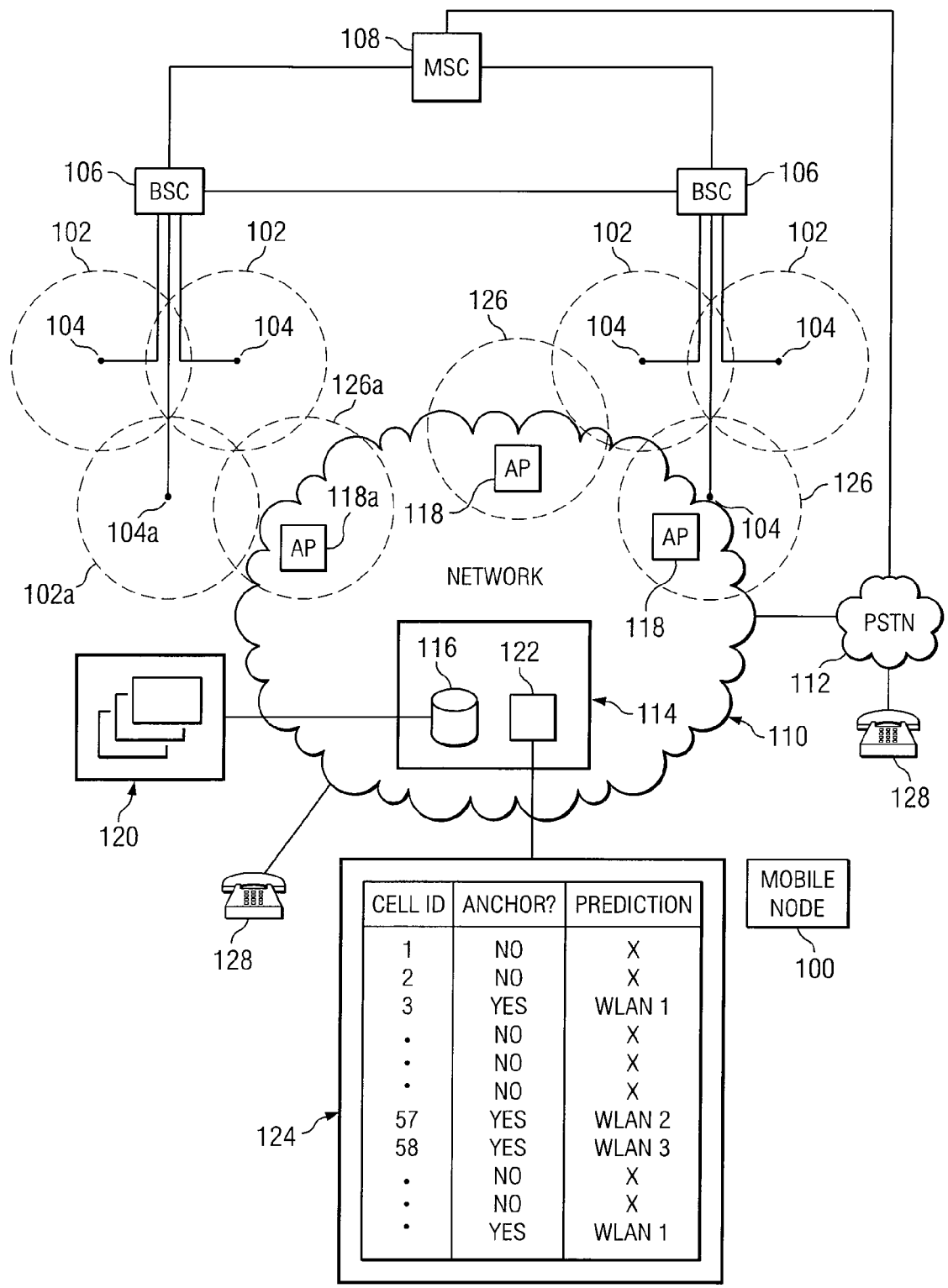
FIG. 1 is a block diagram illustrating a system for processing location information to anchor a communication session.

Embodiments of the present invention and its advantages are best understood by referring to FIGS. 1 through 4 of the drawings, like numerals being used for like and corresponding parts of the various drawings.

FIG. 1 is a block diagram illustrating a system for processing location information to anchor a communication session. According to an embodiment, the system anchors a communication session for a mobile node in a network if there is an access point that can provide the mobile node access to the network. Anchoring is based on the location information gathered by the mobile node over a time interval or based on a usage pattern. The location information includes any suitable information, such as cellular identifiers or power measures that provide information about the location of the mobile node in a cellular network.

According to the illustrated embodiment, system 10 operates to provide services, such as communication sessions, to endpoints, such as devices 128 and mobile node 100. Devices 128 may be any combination of hardware and/or software that provide communication services to a user. Devices 128 may include analog, digital, or Internet Protocol (IP) telephones, a personal computer such as a laptop or a desktop, a personal computer running a telephony application, a personal digital assistant, or any suitable device operable to communicate with system 10, particularly network 110 and/or PSTN 112.

A communication session, or call, may refer to an active communication between endpoints, measured from endpoint to endpoint. Information is communicated during a communication session. Information may refer to voice, data, text, audio, video, multimedia, control, signaling, other information, or any combination of the preceding. System 10 may communicate information in packets or any other format or protocol. A packet may comprise a bundle of data organized in a specific way for transmission, and a frame may comprise the payload of one or more packets organized in a specific way for transmission. A packet-based communication protocol, such as IP, may be used to communicate the packets.

Mobile node 100 represents any suitable device operable to communicate with a communication network via a wireless link. Mobile node 100 collects location information of cell sites 102 and reports the information to server 114 of network 110. Information may be cellular identifiers, power measures, latitude and/or longitudinal coordinates, time information, or any other information provided by cell sites 102 either as data in communications or the nature and strength of radio frequency signals from cell sites 102. Mobile node 100 collects the information during a communication session or when mobile node 100 is idle. Mobile node 100 includes any suitable arrangement of components operable to form the operations of mobile node 100, and may comprise logic, an interface, memory, other component, or any suitable combination of the preceding. Mobile node 100 may comprise, for example, a personal digital assistant, a computer such as a laptop, a cellular telephone, a mobile handset, or any other device operable to communicate with system 10. According to one embodiment, mobile node 100 may be operable to communicate with different types of networks. As an example, mobile node 100 may be operable to communicate with a cellular network and an IP wireless local area network (WLAN), such as a WiFi network.

System 10 includes communication networks. A communication network allows devices, such as mobile node 100, to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, other suitable communication link, or any combination of the preceding.

According to one embodiment, system 10 includes networks of different network types. A network type may be designated in accordance with the communication protocols and technologies used for the network. Examples of networks of different network types include cellular networks, WLANs, voice over IP (VoIP) networks, network types involving other communication protocols or technologies, or any combination of the preceding. The elements of system 10 can operate to permit mobile node 100 to maintain a communication session that is handed off between network types. For example, mobile node 100 can have a communication session that is handed off between a cellular network and a WLAN.

A cellular network provides communication services for mobile node 100 using any suitable cellular protocol and technology. The cellular network may use various cellular protocols and technologies, including but not limited to global system for mobile communications (GSM), code division multiple access (CDMA), and any other appropriate analog or digital wireless protocol or technology. Furthermore, the cellular network may utilize signaling system 7 (SS7) protocol for signaling purposes. In the illustrated embodiment, the cellular network includes a series of overlapping cell sites 102. A cell site 102 may comprise any suitable element operable to provide cellular wireless services to mobile nodes 100 present in the service area of cell site 102. Even though cell site 102 is represented in a circular configuration, cell site 102 may provide service in any suitable configuration and/or geographic area. In one embodiment, cell site 102 includes a base transceiver station (BTS) 104 coupled to base station controller (BSC) 106, which covers a geographic region and communicates with mobile node 100 present in the service area of cell site 102. BTS 104 communicates signals to and from mobile node 100 through a wireless link, which is typically a radio frequency link. BSCs 106 communicate with each other and with a mobile switching center (MSC) 108. BSC 106 manages the operation of BTS 104. BSCs 106 and MSC 108 provide switch and intra-cellular soft handoff functionality for mobile node 100 traveling through the different coverage areas of cell sites 102. The cellular network includes any suitable number of BTSs 104, BSCs 106, MSCs 108, and other appropriate communication elements.

A WLAN 126 provides communication services for mobile node 100 using any suitable wireless protocol and technology. WLAN 126 utilizes wireless standards, such as the 802.11 family of wireless standards, to provide wireless telephony services to mobile node 100. The 802.11 family of wireless standards includes, among others, 802.11a, 802.11b, and 802.11g. WLAN 126 provides communication services to mobile node 100 present in a service area of WLAN 126. WLAN 126 includes a WLAN access point 118, which covers a geographic region and communicates with mobile node 100 present in the service area of WLAN 126. Access point 118 communicates signals to and from mobile node 100 anchored with access point 118. Access point 118 represents a communication element, including hardware and any appropriate controlling logic, for providing wireless access to WLAN 126. Access point 118 uses any appropriate wireless standard or protocol.

Communication network 110 represents any suitable network that provides communication services for mobile node 100 using any suitable wireline or wireless protocol. For example, network 110 utilizes circuit-switched and/or packet-based communication protocols to provide for wireline telephony services, such as IP. Network 110 may include a local area network (LAN), a metropolitan area network (MAN), a wide area network (WAN), a public land mobile network (PLMN), a network-based call signaling (NCS) network, a session initiation protocol (SIP) peer network, any other public or private data network, a local, regional, or global communication network such as the Internet, an enterprise intranet, other suitable wireline or wireless communication link, or any combination of the preceding. Network 110 may include any combination of network elements, such as gateways, routers, hubs, switches, and any other hardware and/or software that may implement any suitable protocol or communication.

Public switched telephone network (PSTN) 112 represents communications equipment, including hardware and any appropriate controlling logic, through which any suitable network may communicate. PSTN 112 may include switches, wireline and wireless communication devices, and any other appropriate equipment for interconnecting PSTN 112 with other networks. PSTN 112 may include portions of public and private networks providing network transport services between various geographic areas and networks. In an embodiment, a gateway may facilitate the interaction between PSTN 112 and other networks, such as network 110, by converting communications between different communication protocols.

In the illustrated embodiment, network 110 includes a server 114 that facilitates receiving and processing location information. Server 114 includes an information database 116 that stores location information. Location information represents information about cell sites 102, such as a unique identification. The unique identification may include a cellular identification, a carrier identification, a system identification, or any suitable identification that enumerates the geographical area for which mobile node 100 collects the information. The location information includes information collected by mobile node 100 to learn location information of various carriers in the vicinity of network 110 and, in one embodiment, the usage pattern of mobile node 100. To learn location information conventionally, server 114 may probe databases of cellular service providers or use a geographic mapping of wireless areas. However, the conventional method requires retrieving proprietary information of cellular service providers or conducting substantial work to generate a geographic mapping. In an embodiment, server 114 receives gathered location information without having to access the databases of cellular service providers. Location information may also represent a vector of information that provides different parameters of cell site 102 and/or mobile node 100. For example, the vector of location information may include a cellular identifier, the time of day the identifier was collected, and/or any suitable parameter.

Server 114 processes the received location information into reports 120 that represent the collected location information. Reports 120 include location information received from one or more mobile nodes 100. Reports 120 may represent the location information in any suitable manner. For example, each mobile node 100 may have an associated report 120. As another example, server 114 may consolidate the location information received from mobile nodes 100 and store a consolidated report 120 that does not include duplicate location information. Reports 120 may also represent vectors that include location information, duration of a call, or other suitable parameters that provide for predicting a pattern of mobile node 100.

Server 114 also includes prediction table 124 that allows server 114, using a prediction-developer 122, to predict whether to anchor mobile node 100 with access point 118 before mobile node 100 enters WLAN 126. Based on the location information of cell sites 102, server 114 uses a prediction-developer 122 to build prediction table 124 for use in making anchoring decisions. Prediction table 124 includes the cellular identifiers received in the location information, a determination of whether to anchor a call, and an associated anchor point to anchor with if the call is to be anchored. For example, each cellular identifier is associated with a prediction of whether to anchor a communication session with access point 118. Some cellular identifiers indicate anchoring is not required and do not have an associated anchor point, while other cellular identifiers have a prediction that includes an associated WLAN 126. In an embodiment, prediction table 124 does not include entries for cellular identifiers that do not have an associated anchor point. In this embodiment, mobile node 100 may determine whether its current cellular identifier is in prediction table 124. If prediction table 124 includes the cellular identifier, the call is anchored with the associated anchor point listed in prediction table 124. On the other hand, if prediction table 124 does not include the cellular identifier, the call is not anchored. Server 114 includes any suitable arrangement of components operable to receive location information and build prediction table 124, and may comprise logic, an interface, memory, other component, or any suitable combination of the proceeding.

In an embodiment, server 114 uses the location information to intelligently determine which access point 118 to anchor mobile node 100 before mobile node 100 moves into the service area of WLAN 126. Server 114 may distribute the location information associated with mobile node 100 to mobile node 100. Therefore, mobile node 100 locally determines whether to anchor a communication session when a communication session begins. In another embodiment, server 114 uses classification and prediction techniques, in addition to the location information, to select an anchor point for mobile node 100. For example, mobile node 100 collects statistics on the parameters at the start of each call and reports the statistics to server 114. The collection may be in two classes: calls remaining active as mobile node 100 moves into WLAN 126 and calls terminated in the cellular network. Server 114 applies learning algorithms, such as Bayesian classifiers, to the reported data to build prediction table 124. As mobile node 100 collects the location information, server 114 learns the patterns of mobile node 100 and may predict the usage of mobile node 100. Because server 114 has learned the usage patterns of mobile node 100, server 114 predicts whether and when calls of mobile node 100 handoff to WLAN 126. In an embodiment, the prediction information is represented in prediction table 124 that provides a prediction identifying WLAN 126 in which to anchor the communication session. Prediction table 124 associates the prediction with each cellular identifier received from mobile node 100. Prediction table 124 takes any suitable form, such as being indexed by cellular identifier or cellular system. In an embodiment, mobile node 100 downloads its associated prediction information from the prediction table 124 and uses it to determine whether and where to anchor a new call.

A communication session of mobile node 100 may be anchored at an anchor point of a network. Anchoring a communication session at the anchor point refers to having the anchor point process signaling of the communication session. A communication session is typically anchored during call setup, a first leg of a communication session, and mobile node 100 is re-attached to the anchor point during a handoff procedure, using a second leg of the communication session. Anchoring the communication session may reduce efficiency, especially in cases where a handoff to the network may not or cannot occur. For example, mobile node 100 may have a home IP network in the United States. If mobile node 100 visits an IP network in Singapore, and if the communication session is anchored in the United States, the communication session would require two international call legs. Accordingly, if handoff to the home IP network may not or cannot occur, then anchoring the communication session in the home IP network reduces efficiency.

According to one embodiment, a communication session beginning in a first network is anchored in the second network if there is a likelihood of handoff to the second network as determined from location information processed into prediction information. The decision to anchor the session is made when the session begins for an outgoing and incoming call. For example, mobile node 100 initiates a communication session in cell site 102. Based on location information collected according to the usage pattern of mobile node 100, there is a likelihood the session will be handed off to WLAN 126. Therefore, the session is anchored with access point 118 at the start of the communication session, which provides for an efficient use of resources.

In operation, mobile node 100 gathers location information as it travels through cell sites 102. Mobile node 100 gathers the location information within a configurable time interval or according to usage patterns of mobile node 100. For example, mobile node 100 gathers the location information over fifteen-minute intervals. Using time units as a triggering event provides for determining the boundary of interest adjacent to WLAN 126 by comparing the expected duration of an active session that may need to be handed off. As another example, mobile node 100 gathers the location information from the start of a call until mobile node 100 moves into the service area of WLAN 126. In this example, mobile node 100 gathers the location information even if it is outside the configured reporting interval and provides a vector of information to server 114. As yet another example, the usage pattern of mobile node 100 is based on presence information of mobile node 100. Mobile node 100 may report location information gathered for the full duration of the call. Gathering information in this way allows location server 112 to learn patterns of mobile node 100. A triggering event causes mobile node 110 to create a list of the location information seen and to send the list to server 114. The triggering event may include mobile node 100 roaming into network 110 with or without an active call, server 114 requesting the location information from mobile node 100, expiration of a time interval, or any other suitable event to cause server 114 to receive the location information.

Server 114 stores the received location information in database 116 and uses prediction-developer 122 to build a prediction table 124. Server 114 uses the location information to build a predictor that includes whether calls handoff to WLAN 126. Server 114 instructs mobile node 100 whether to anchor the call initiated in a particular cell site 102 with access point 118 in WLAN 126. In another embodiment, mobile node 100 uses the prediction to determine whether to anchor an initiated call based on its current location.

Mobile node 100 initiates a communication session. Server 114 determines the current location of mobile node 100. For example, mobile node 100 may be in cell site 102a or WLAN 126a. If mobile node 100 is in WLAN 126a, the session is anchored with access point 118a. If mobile node 100 is in cell site 102a, server 114 determines whether to anchor the session with WLAN 126 based on information in prediction table 124. If cell site 102a has an associated WLAN 126, according to information in prediction table 124, server 114 anchors the call with WLAN 126. However, if cell site 102a does not have an associated WLAN 126, the session remains in the cellular network. The network in which the session is anchored, the cellular network or WLAN 126, completes the call to destination device 128 or destination mobile node 100.

Modifications, additions, or omissions may be made to system 10. For example, mobile node 100 or server 114 may perform and implement the prediction. As another example, mobile node 100 may include the functionality to perform the operation of server 114, such as using the location information to build prediction table 124. The components of system 10 may be integrated or separated according to particular needs. For example, system 10 may include other suitable devices, such as a gateway, a home agent, a foreign agent, an authorization server, other device, or any combination of the preceding. A gateway represents any suitable device operable to interconnect with a network, and may convert communications between different communication protocols. A home agent of mobile node 100 refers to an agent that maintains the address of mobile node 100 and forwards data to mobile node 100. A foreign agent of mobile node 100 refers to an agent that provides the home agent of mobile node 100 with an address to which data for mobile node 100 may be forwarded. Moreover, the operations of system 10 may be performed by more, fewer, or other modules. Additionally, operations of system 10 may be performed using any suitable logic.

FIG. 2 is a flowchart 20 for gathering the location information. At step 200, mobile node 100 monitors cell sites 102. Mobile node 100 monitors cell sites 102 during a communication session and when it is idle. From the monitoring, mobile node 100 collects location information from cell sites 102 at step 202. In an embodiment, mobile node 100 collects the location information from cell site 102 in which mobile node 100 is present. In another embodiment, mobile node 100 collects the location information from cell sites 102 that mobile node 100 does not enter. Mobile node 100 collects the location information through any suitable communication link, such as a radio frequency link or other wireless link. As discussed above, mobile node 100 may collect the location information as a vector of parameters illustrating the usage pattern of mobile node 100 or as identification information of cell site 102 that mobile node 100 enters during a time interval. In an embodiment, mobile node 100 collects the location information of cell site 102 while in the service area of cell site 102.

At step 204, it is determined whether a triggering event occurs. A triggering event includes any suitable occurrence to initiate reporting the location information to server 114. For example, a triggering event includes a time interval expiring, roaming into a different network type, ending a communication session, or configuring the triggering event to occur at a particular time. At step 206, the location information is processed. At step 208, mobile node 100 determines whether to process the information locally or send the information to server 114 for remote processing. If mobile node 100 processes the information locally, mobile node 100 stores the location information at step 210. If mobile node 100 does not process the information locally, mobile node 100 sends the information to server 114 for processing at step 212.

Modifications, additions, or omissions may be made to flowchart 20. Flowchart 20 may include more, fewer, or other steps. For example, mobile node 100 may automatically report collected location information when it is collected rather than waiting for a triggering event to occur to report the information. Additionally, steps may be performed in any suitable order.

FIG. 3 is a flowchart 30 for processing the location information to generate prediction information. At step 300, server 114 receives the location information from mobile node 100. Server 114 analyzes the location information at step 302 to generate prediction information. For example, server 114 consolidates duplicate location information into report 120. In an embodiment, server 114 uses the received location information of mobile node 100 to determine whether to anchor sessions of mobile node 100 with WLAN 126 before anchoring is actually needed, and which WLAN 126 to anchor the session. Therefore, server 114 may anchor sessions of mobile node 100 with the appropriate WLAN 126 before mobile node 100 reaches its final service area.

At step 304, server 114 determines whether the information was processed at mobile node 100. If server 114 determines that mobile node 100 processed the information, mobile node 100 stores the information at step 306. If server 114 determines that mobile node 100 did not process the information, server 114 stores the information at step 308. In an embodiment, database 116 in server 114 stores the information in reports 120. At step 310, location server 112 provides the location information to mobile node 100. Mobile node 100 may use the information to determine whether to anchor the call and where to anchor the call.

Modifications, additions, or omissions may be made to flowchart 30. For example, mobile node 100 analyzes the gathered location information and generates the prediction information. Flowchart 30 may include more, fewer, or other steps. Additionally, steps may be performed in any suitable order.

FIG. 4 is a flowchart 40 illustrating one embodiment of a method for determining whether to anchor the communication session according to the gathered location information. Mobile node 100 initiates a communication session at step 400. At step 402, it is determined whether the session is in WLAN 126. If the session is in WLAN 126, server 114 anchors the session with access point 118 at step 412. If the session is not in WLAN 126, server 114 receives the current location of mobile node 100 at step 404.

At step 406, server 114 retrieves prediction information corresponding to the current location of mobile node 100. Prediction table 124 includes cellular identifiers, one of which identifies the current location of mobile node 100, and an associated WLAN 126 if the session is to be anchored in WLAN 126. From the information in prediction table 124, server 114 determines whether to anchor the session with WLAN 126 at step 408. If the cellular identifier identifying the current location of mobile node 100 does not have an associated WLAN 126 in prediction table 124, server 114 anchors the session with cellular network at step 410. If the cellular identifier identifying the current location has an associated WLAN 126, server 114 anchors the session with access point 118 at step 412.

Modifications, additions, or omissions may be made to flowchart 40. For example, mobile node 100 includes prediction table 124 that has cellular identifiers and corresponding WLANs 126. In this example, mobile node 100 determines its current location and determines whether to anchor the session according to the location information in prediction table 124. Mobile node 100 does or does not anchor the session based on the information in prediction table 124. Flowchart 40 may include more, fewer, or other steps. Additionally, steps may be performed in any suitable order without departing from the scope of the invention.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for analyzing location information of a mobile node from a first wireless network to determine whether to anchor a communication session in a second wireless network, the system comprising:
a mobile node operable to receive location information from one or more service areas of a first wireless network as the mobile node moves through the one or more service areas of the first wireless network; and
a server operable to:
develop a prediction based on the location information, wherein the prediction comprises whether the mobile node will move into the second wireless network during a communication session initiated at a particular location in the first wireless network; and
determine whether the mobile node initiates the communication session in the first wireless network;
if the mobile node initiates the communication session in the first wireless network:
receive a current location of the mobile node in the first wireless network; and
determine, during initiation of the communication session in the first wireless network, whether to anchor the communication session in the second wireless network, wherein the determination is according to the prediction and the communication session is anchored in the second wireless network during initiation of the communication session in the first wireless network.

2. The system of claim 1, wherein the server is further operable to receive location information for a time interval as the mobile node moves through the first wireless network.

3. The system of claim 2, wherein the time interval ends upon a selected one of expiration of a predetermined time interval and moving into coverage of the second wireless network.

4. The system of claim 1, wherein the server is further operable to associate the location information with the second wireless network if the mobile node enters the second wireless network during the communication session.

5. The system of claim 1, wherein the server is further operable to:
generate prediction information, the prediction information indexed by location information from the first wireless network; and
determine, according to the prediction information, whether the communication session initiated in a location in the first wireless network will handoff to the second wireless network.

6. The system of claim 1, wherein the server is further operable to:
receive a plurality of reports; and
predict whether the mobile node will move into the second wireless network.

7. The system of claim 1, wherein the server is further operable to communicate prediction information to the mobile node.

8. The system of claim 1, wherein the server is further operable to receive the location information from the mobile node to develop the prediction.

9. The system of claim 1, wherein the server is further operable to:
store the prediction; and
retrieve the prediction when determining whether to anchor the communication session in the second wireless network.

10. A system for determining whether to anchor a communication session for a mobile node in a second wireless network, the system comprising:
a mobile node operable to receive location information from one or more service areas of a first wireless network as the mobile node moves through the one or more service areas of the first wireless network; and
a server operable to:
determine a current location of the mobile node in the first wireless network;
retrieve prediction information generated from the location information; and
determine, during initiation of the communication session in the first wireless network, whether to anchor the communication session in the second wireless network, wherein the determination is according to the prediction information and the communication session is anchored in the second wireless network during initiation of the communication session in the first wireless network.

11. The system of claim 10, wherein the server is further operable to:
determine coverage in the second wireless network; and
hand off the communication session from the first wireless network to the second wireless network.

12. The system of claim 11, wherein the server is further operable to:
establish a first leg of the communication session from the mobile node to the second wireless network; and
establish a second leg of the communication session from the second wireless network to a destination.

13. The system of claim 10, wherein the server is further operable to facilitate continuing the communication session in the first network if the retrieved prediction information does not provide the second wireless network in which to anchor the communication session.

14. The system of claim 10, wherein the server is further operable to retrieve the prediction information from the mobile node.

15. A system for gathering location information of a mobile node from a first wireless network to determine whether to anchor a communication session in a second wireless network, the system comprising:
a mobile node operable to:
receive location information from one or more service areas of a first wireless network as the mobile node moves through the one or more service areas of the first wireless network;
determine whether a triggering event occurs;
if the triggering event occurs, store the location information to determine whether to anchor a session in the second wireless network;
initiate a communication session in the first wireless network;
receive a current location of the mobile node in the first wireless network;
retrieve prediction information generated from the location information previously gathered; and
determine, during initiation of the communication session in the first wireless network, whether to anchor the communication session in the second wireless network, wherein the determination is according to the prediction information and the communication session is anchored in the second wireless network during initiation of the communication session in the first wireless network.

16. The system of claim 15, wherein the triggering event comprises a selected one of expiration of a predetermined time interval and moving into coverage of the second wireless network.

17. The system of claim 15, wherein the mobile node is further operable to receive the location information during the communication session.

18. The system of claim 15, wherein the first network is a cellular network and the location information is cellular identifiers.

19. The system of claim 15, wherein the mobile node is further operable to:
receive a plurality of locations for a time interval as the mobile node moves through the first wireless network; and
predict, based on the location information, whether the mobile node will move into the second wireless network during the communication session initiated at a particular location in the first wireless network.

20. The system of claim 15, further comprising:
a server operable to:
store the location information to determine whether to anchor a session in the second wireless network; and
store the prediction information generated from location information; and
the mobile node is further operable to retrieve the prediction information from the server.

* * * * *